(12) United States Patent
Varo et al.

(10) Patent No.: US 7,653,999 B2
(45) Date of Patent: Feb. 2, 2010

(54) CO-EXTRUDED GENERATING BANK SWAGED TUBING

(75) Inventors: Dirk B. Varo, Cambridge (CA); Edward F. Stortz, Cambridge (CA)

(73) Assignee: Babcock & Wilcox Canada Ltd. (CA)

( * ) Notice: Subject to any disclaimer, the term of this patent is extended or adjusted under 35 U.S.C. 154(b) by 584 days.

(21) Appl. No.: 11/095,915

(22) Filed: Mar. 31, 2005

(65) Prior Publication Data

US 2006/0218792 A1 Oct. 5, 2006

(51) Int. Cl.
*B21D 21/00* (2006.01)
(52) U.S. Cl. .................. 29/890.053; 29/423; 29/527.1; 29/890.051; 428/586
(58) Field of Classification Search ............ 29/890.053, 29/527.1, 423; 428/586; 280/31
See application file for complete search history.

(56) References Cited

U.S. PATENT DOCUMENTS 6,495,268 B1 * 12/2002 Harth, III ..................... 428/586
6,691,397 B2 * 2/2004 Chakravarti ................. 29/527.1
6,799,357 B2 * 10/2004 Webb et al. ................... 29/423

* cited by examiner

*Primary Examiner*—Rick K Chang
(74) *Attorney, Agent, or Firm*—Michael J. Seymour; Eric Marich

(57) ABSTRACT

A method is provided for successfully rolling co-extruded tubing into drums of a boiler bank. First, a co-extruded tube is provided, containing a carbon steel base tubing with an outer layer of high alloy tubing. Next, the outer layer of high alloy tubing is removed by machining in the area of the co-extruded tubing that is to be rolled into the drum. Then, the co-extruded tubing is swaged using multiple swaging steps and annealing treatments. The co-extruded tubing is swaged to the required diameter and wall thickness. Finally, co-extruded tubing is inserted, rolled, and sealed into the drums.

6 Claims, 2 Drawing Sheets

CO-EXTRUDED GENERATING BANK SWAGED TUBING

FIELD AND BACKGROUND OF INVENTION

The present invention relates generally to the field of boiler construction and in particular to a new method for making near drum boiler tubes more resistant to corrosion or erosion.

Smaller, low pressure industrial boilers typically use an additional bank of heat exchanger tubes called the boiler bank or steam generating bank. This additional bank is needed when the heat transfer surface in a furnace may not be sufficient to generate enough saturated steam for the particular end use desired. This boiler bank is typically composed of a steam drum on top, a second mud drum on the bottom, and a series of bent connecting tubes. Subcooled water travels down the tubes into the lower drum. The water is then distributed to other tubes where it is partially converted to steam and returned to the steam dream. The lower drum is often called the mud drum because sediments found in boiler water tend to settle out and collect in this drum. A construction of a boiler bank is illustrated and described in Chapter 1, page 1-8 of *Steam/its generation and use*, $40^{th}$ Ed, Stultz and Kitto, 1992.

Steam generating bank tubes in recovery boilers and biomass fired power boilers are particularly susceptible to near drum corrosion/erosion, and in particular, tube wall thinning near the lower drum of the boiler's generating bank. Generating bank tubes are inserted and rolled into the steam and mud drums. The near drum corrosion/erosion takes place on the generating bank tube next to the drum surface. The near drum wastage from corrosion/erosion requires that the tubes in the generating bank are replaced in a periodic fashion to prevent tube leaks in the thinned areas of the wastage.

A number of remedies have been attempted to reduce the wastage rate from near drum corrosion/erosion. U.S. Pat. No. 6,495,268 and U.S. Pat. No. 6,800,149 entitled "Tapered Corrosion Protection of Tubes at Mud Drum Location", remedies this problem under certain conditions. Laser cladding is used to produce a corrosion resistant cladding layer, which advantageously tapers along a length of the end portion of the tube. A protective layer of stainless steel powder is fused to the surface of each tube's outer diameter using the laser beam. This manufacturing process protects the portion of the tube that penetrates the lower steam drum.

Chromizing of the tubing near the drums also has been attempted with limited success. Ceramic sleeves, tube shields, metal spray coatings in the affected area and thicker tubes have all been attempted with limited success as well.

A variety of other corrosion resistant technologies are described in the background section of U.S. Pat. No. 6,495,268 and U.S. Pat. No. 6,800,149, and are hereby incorporated by reference.

U.S. Pat. No. 4,658,761 discloses in the background section that one expensive solution to corrosion of boiler tubes is an expensive technique whereby corrosion resistant metal alloys are co-extruded over mild steel tubes.

U.S. Pat. No. 4,463,061 discloses that it has been proposed to provide a composite boiler tube having a surface layer and an inner layer in which outer layer there is afforded an improved high temperature corrosion resistance, as shown in a prior art reference entitled "Co-Extruded Tubes Improve Resistance to Fuel Ash Corrosion in U.K. Utility Boilers" described by T. Flatly et al in "Material Performance Vol. 20 No. 5" dated May, 1981. However, the composite boiler tube of the reference is still insufficient in the points of high temperature corrosion resistance and creep strength in a case where the temperature of the outer surface layer of a boiler tube becomes about 700 degrees Celsius or above.

The two types of co-extruded tubing that are commercially available for use in boiler tubing today include 2.500" OD×0.257" wall thickness carbon steel base tubing with a co-extruded outer layer of either Nickel-Iron-Chromium alloy with additions of Molybdenum and Copper under the tradename INCONEL 825 or stainless steel (SA213TP304). These are used in areas of the high corrosion rates to reduce wastage of the boiler tubing.

A more flexible solution that works under various conditions is still needed for decreasing the corrosion/erosion rate of generating bank tubes in the region near the mud or steam drums. A solution is also needed for a Iternatively providing a way to protect the entire length of the generating bank (in the case of making the entire tube out of the co-extruded tube) or just the portion near the drum can be protected (in the case of using just a small length of the co-extruded tubing near the drum).

SUMMARY OF INVENTION

It is an object of the present invention to provide a solution for decreasing the corrosion/erosion rate of generating bank tubes in the region near the mud or steam drums.

It is a further object of the present invention to alternatively provide a way to protect the entire length of the generating bank (in the case of making the entire tube out of the co-extruded tube) or just the portion near the drum can be protected (in the case of using just a small length of the co-extruded tubing near the drum).

Accordingly, a method is provided for successfully rolling co-extruded tubing into drums of a boiler bank in a corrosion and erosion boiler environment. The method comprises the following steps. First, a co-extruded tubing is provided. The co-extruded tubing contains a carbon steel base tubing, an outer layer of high alloy tubing, an area that is to be rolled into the drum by machining, and an area that is to be exposed to the boiler environment. The second step involves removing the outer layer of high alloy tubing in the area that is to be rolled into the drum by machining. The third step involves swaging the co-extruded tubing using multiple swaging steps and annealing treatments to swage the co-extruded tubing to a required diameter and wall thickness. Finally, the co-extruded tubing is inserted, rolled, and sealed into the drums.

Alternatively, a method is provided for protecting near the drums only by successfully rolling co-extruded tubing into drums of a boiler bank. The method includes the steps of providing a short co-extruded tubing containing a carbon steel base tubing, an outer layer of high alloy tubing, and an area that is to be rolled into the drum by machining, removing the outer layer of high alloy tubing in the area that is to be rolled into the drum by machining, swaging the short co-extruded tubing using multiple swaging steps and annealing treatments to swage the co-extruded tubing to a required diameter and wall thickness, welding the short co-extruded tubing onto a carbon steel generating bank tube that has been cut and prepared to accept the short co-extruded tube after it has been swaged, and inserting, rolling, and sealing the co-extruded tubing into the drums.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

A preferred method for successfully rolling co-extruded tubing into drums of a boiler bank includes the steps of providing a co-extruded tube containing a carbon steel base tubing with an outer layer of high alloy tubing, removing the outer layer of high alloy tubing in the area that is to be rolled into the drum by machining, swaging the tubing using multiple swaging steps and annealing treatments to swage the tubing to the required diameter and wall thickness, inserting the tubing into the drums, rolling the tubing, and sealing the tubing into the drums.

Figure 1:
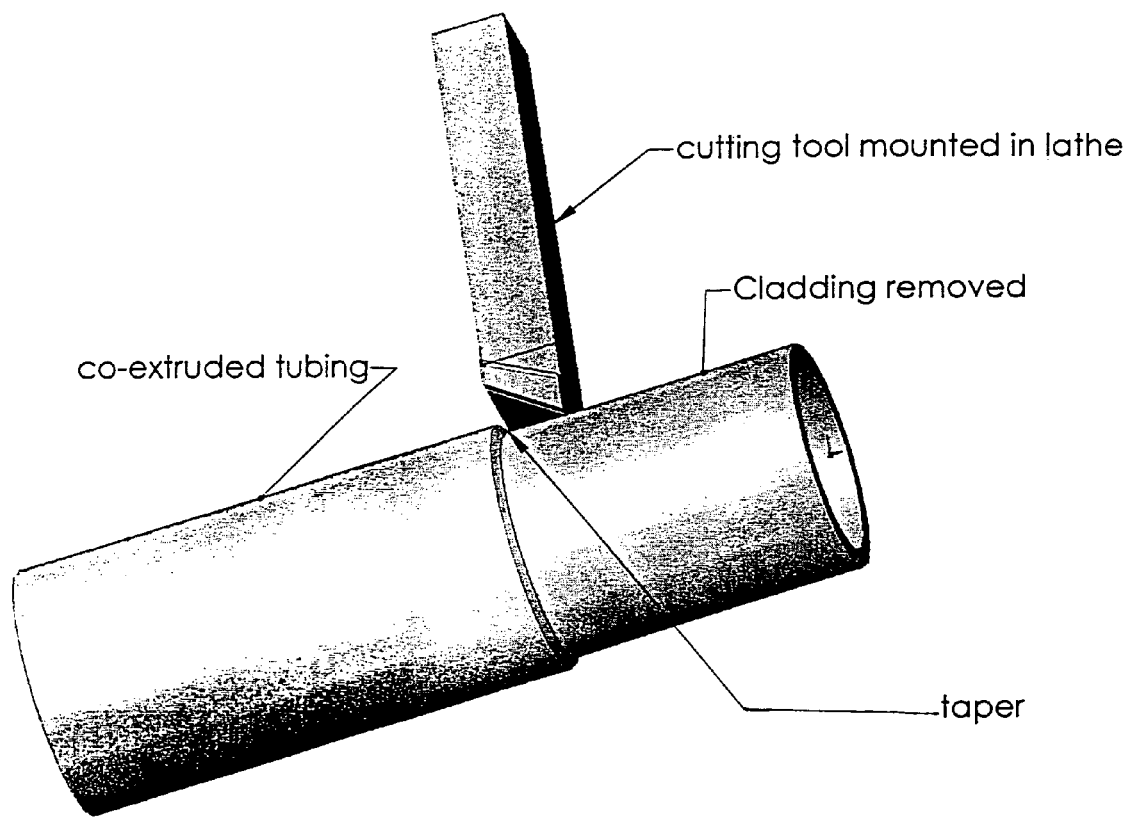
FIG. 1 is a drawing of a co-extruded tube of the present invention wherein the outer layer of high alloy has been removed prior to swaging.
Figure 2:
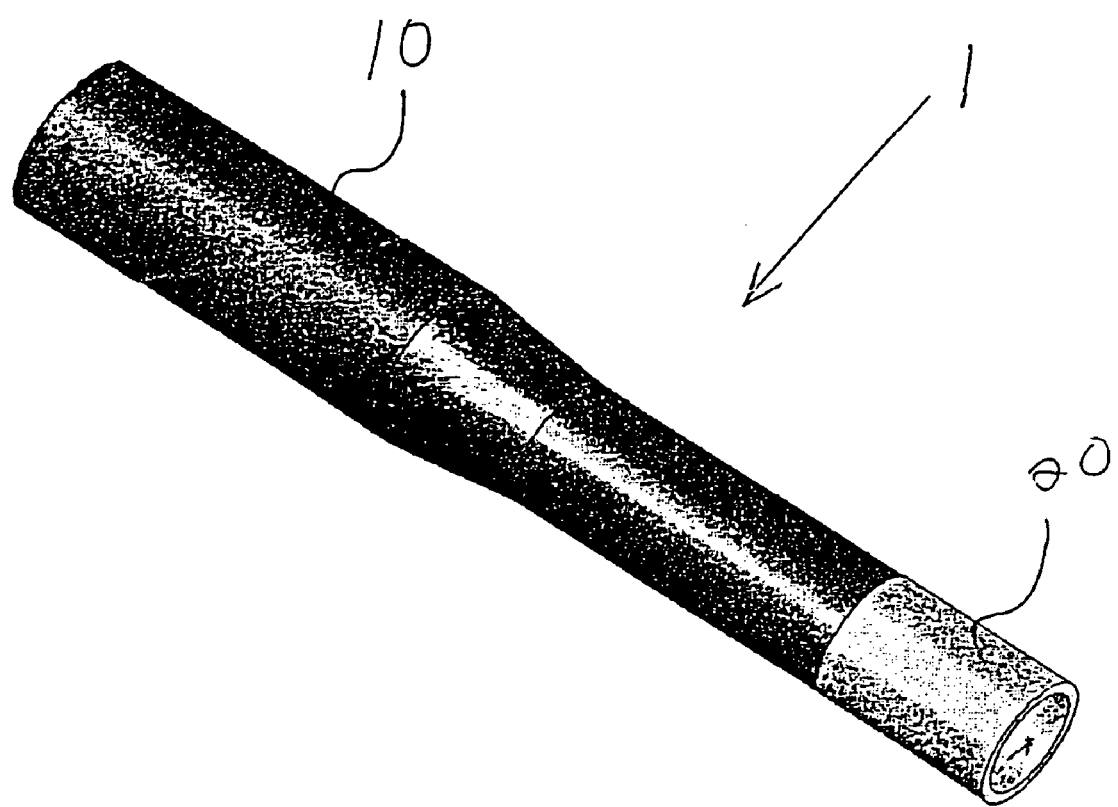
FIG. 2 is a drawing of the co-extruded tube of the present invention after removal of the outer layer of high alloy and swaging.

The first step of the method is required because the outer layer of high alloy material on a coextruded tubing prevents proper sealing in the area that is rolled into the drum. In order to overcome this sealing problem, the outer layer of high alloy tubing in the area that is to be rolled into the drum, is removed by machining leaving only the inner core carbon steel tubing in the area that will be inserted and rolled and sealed into the drum. The initial transition from the portion of the tubing with the outer layer removed to the area of the tube where the outer layer is intact is made with a machined taper as shown in FIG. 1. As shown in FIG. 2, The transition is located such that the outer layer is present over the entire surface 10 of the co-extruded tubing 1 that is exposed to the boiler corrosion/erosion environment. Only that portion of the tube in the seal area 20 below the drum surface is bare of the outer high alloy layer as shown in FIG. 1.

The machining is performed prior to swaging so that the alloy layer is swaged into the surface of the carbon steel inner base tube, and that after swaging there is no transition in outer diameter ("OD") from the bare base tube region and the region that has a layer of the high alloy OD material. The swaging process removes the step on the OD from the high alloy region to the bare carbon steel region, and this permits the tube to be close fitting in the hole in the drum through which the swaged portion is inset, and it also allows the tube to make a good leak tight seal after the tube is rolled into the seat area. Machining off the high alloy cladding after swaging would result in a step in the OD of the tube in the region to be inserted into the drum hole. This would hinder insertion and also interfere with rolling and the sealing process.

Next, the tubing is swaged using multiple swaging steps and annealing treatments to swage the tubing to the required diameter and wall thickness for insertion, rolling, and sealing into the drums. FIG. 2 shows the co-extruded tube after it has been swaged. The resultant generating bank tube is therefore corrosion resistant over the entire surface that is exposed to the corrosive/erosive boiler environment.

In an alternative embodiment, the same method as described above may be used for protection of only the vicinity of the drum surface. Such a method is used when general corrosion or erosion of the generating bank is not an issue. A short piece of the co-extruded tubing can be used for the area that will be swaged. The short piece can be machined, swaged, and annealed as indicated above for the longer generating bank tubing. After it is properly machined, swaged and annealed and cut to length, then this short piece or co-extruded tubing can be welded onto a carbon steel generating bank tube that has been cut and prepared to accept this short swaged tube. This reduces the cost of the generating bank, since expensive co-extruded tubing is not required for the entire length of the generating bank. Only a short length of the coextruded tubing is required that covers the area with the corrosion/erosion wastage problem.

While a specific embodiment of the invention has been shown and described in detail to illustrate the application of the principles of the invention, it will be understood that the invention may be embodied otherwise without departing from such principles.

We claim:

1. A method for successfully rolling co-extruded tubing into drums of a boiler bank in a corrosion and erosion boiler environment comprising the steps of:

provinding a co-extruded tubing containing a carbon steel base tubing, an outer layer of high alloy tubing, an area that is to be rolled into the drum by machining, and an area that is to be exposed to the boiler environment;

removing the outer layer of high alloy tubing in the area that is to be rolled into the drum by machining;

swaging the co-extruded tubing using multiple swaging steps and annealing treatments to swage the co-extruded tubing to a required diameter and wall thickness;

inserting the co-extruded tubing into the drums;

rolling the co-extruded tubing; and sealing the co-extruded tubing into the drums.

2. A method according to claim 1, wherein said high alloy tubing comprises a Nickel-Iron-Chromium alloy with additions of Molybdenum and Copper.

3. A method according to claim 1, wherein said high alloy tubing comprises stainless steel.

4. A method according to claim 1, wherein the outer layer of high alloy tubing is removed with a tapered machine.

5. A method according to claim 1, wherein the outer layer of high alloy tubing is swaged into the surface of the carbon steel inner base tubing.

6. A method according to claim 1, including the step of utilizing a cutting tool mounted on a lathe to remove the outer layer of high alloy tubing in the area that is to be rolled into the drum by machining.

* * * * *